(12) United States Patent
Anderson

(10) Patent No.: US 6,290,517 B1
(45) Date of Patent: Sep. 18, 2001

(54) FOLD OUT PORT GROUP FOR PORTABLE COMPUTER

(75) Inventor: Glen J. Anderson, Sioux City, IA (US)

(73) Assignee: Gateway, Inc., North Sioux City, SD (US)

( * ) Notice: Subject to any disclaimer, the term of this patent is extended or adjusted under 35 U.S.C. 154(b) by 0 days.

(21) Appl. No.: 09/375,327

(22) Filed: Aug. 17, 1999

(51) Int. Cl.[7] ........................................... H01R 13/44
(52) U.S. Cl. .................................................. 439/131
(58) Field of Search ............................ 439/131, 946, 439/946.2, 676, 638, 344

(56) References Cited

U.S. PATENT DOCUMENTS

| | | | |
|---|---|---|---|
| 5,538,442 | 7/1996 | Okada | 439/676 |
| 5,547,401 | 8/1996 | Aldous et al. | 439/676 |
| 5,598,319 | 1/1997 | Lee | 361/684 |
| 5,634,802 | 6/1997 | Kerklaan | 439/131 |
| 5,773,332 | 6/1998 | Glad | 439/344 |
| 5,975,927 | * 11/1999 | Giles | 439/131 |
| 6,093,038 | * 7/2000 | Chen et al. | 439/131 |

* cited by examiner

Primary Examiner—Neil Abrams
Assistant Examiner—J. F. Duverne
(74) Attorney, Agent, or Firm—Schwegman, Lundberg, Woessner & Kluth, P.A.; Kenneth J. Cool

(57) ABSTRACT

A notebook computer incorporating a fold out port group incorporating a plurality of I/O ports is herein provided. The port group is hingedly attached to the computer and pivots between a first, stored position and a second, extended position. In the second, extended position, the port group permits convenient access to the ports thereon and further defines a leg to elevate one end of the computer. Ports may be accessible while the port group is in the first, stored position as well. In one embodiment, the port group, while in the first position, is stored within a slot on the bottom of the computer housing. In another embodiment, the port group selectively covers the rear surface of the computer in the stored position and pivots to expose the rear surface when placed in the extended position. The port group may be interchangeable with other port groups to customize the computer for a particular market or particular application.

21 Claims, 7 Drawing Sheets

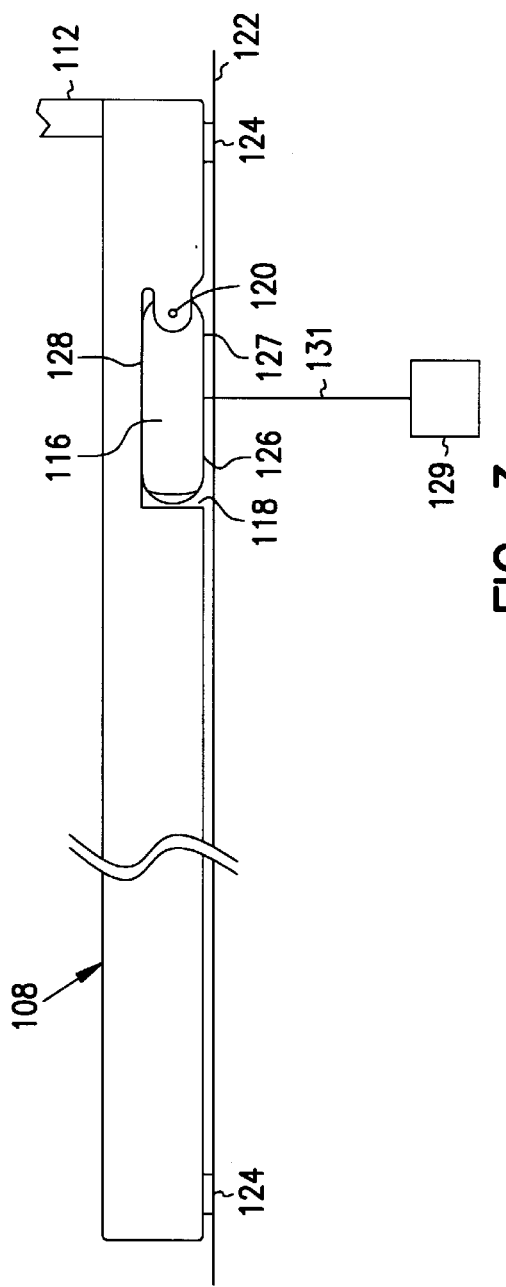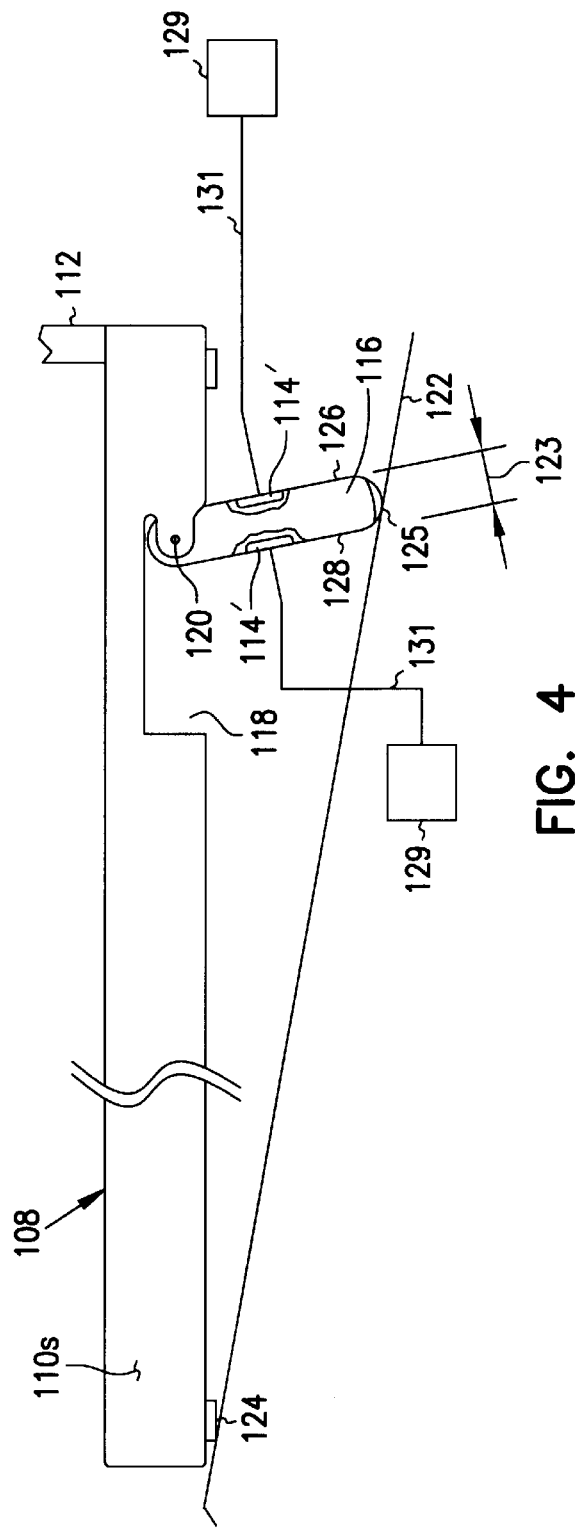

FOLD OUT PORT GROUP FOR PORTABLE COMPUTER

TECHNICAL FIELD

This invention relates generally to portable electronic devices and, more particularly, to a retractable port group for use with a portable computer.

BACKGROUND OF THE INVENTION

In recent years, the consumer electronics industry has experienced nothing short of dramatic growth. This growth is attributable, at least in part, to the seemingly constant miniaturization of electronic components. One industry where miniaturization has contributed to substantial growth is portable computers. For example, a portable computer purchased today is not only more powerful and less expensive than a computer purchased just two to three years ago, but it is also significantly smaller and much lighter. In some instances, these full-featured portable computers— commonly referred to as "notebooks" —weigh only a few pounds and have a footprint barely larger than a letter-size sheet of paper.

In addition to smaller footprints, advances in semiconductor design and LCD displays have permitted manufacturers to similarly reduce the thickness of these computers. The downsizing trend is continuing as even smaller computers (referred to by such names as sub-notebooks, mini-notebooks, and palm and hand-held computers) become available. While the present invention is applicable to most any portable computer or, for that matter, any portable electronic device, the inventor perceives that it is particularly advantageous for use with notebook computers and the remainder of this discussion will focus on the same.

While smaller and thinner notebooks are desirable from the standpoint of portability, drawbacks do exist. In particular, while technological advances have led to a reduction in the size of many computer components, a large number of older, "legacy" devices (i.e., older equipment for which new computers must generally maintain backwards compatibility) have remained virtually unchanged. For example, floppy disk and CD-ROM drives must still accommodate the same media sizes used years ago. Instead of trying to integrate these now relatively large devices into the notebook computer, many manufacturers merely provide them as separate, external components. When needed, the devices are connected to ports on the computer with special cables. These external devices are advantageous as they are not part of the computer housing or chassis and thus do not directly contribute to the size and weight of the computer itself.

Yet another problem with smaller computers is how to conveniently and effectively include the full complement of input/output (I/O) ports necessary for interconnecting both legacy devices as well as more contemporary peripherals. To remain compatible with the vast majority of devices, notebook computers generally include legacy ports for interconnecting external devices such as mice, keyboards, monitors, and printers. These ports, defined years ago, are relatively large and bulky by today's standards, especially with respect to notebook computer having a thin housing. In addition to these legacy ports, modern peripherals require yet even additional ports including USB (universal serial bus), infrared, network (10baseT), and audio/video to name a few. Ultimately, the sheer size and quantity of these ports make it difficult to conveniently incorporate all or even most on today's smaller computers. This problem is further aggravated by the need to provide proprietary ports for connecting external disk drives and CD-ROMs as already discussed above.

One solution to this problem has been to utilize a separate port module or cable having a variety of built-in ports wherein the cable connects to a small, space-efficient connector on the computer housing. Another option is to use a port replicator or docking station which connects to the computer via a similar high density connector and provides the required ports on the replicator/docking station chassis.

While these devices expand small form factor computers (i.e., computers having a relatively reduced size, configuration, or physical arrangement) into multi-I/O port devices, they are generally perceived to be inconvenient. In particular, to utilize the additional ports, the user must carry the port module/replicator with the computer. Not only does this add additional travel weight, it also requires that the user keep up with yet another peripheral item which can be easily lost or misplaced.

Thus, there are unresolved issues with current notebook computers. In particular, what is needed is a notebook computer which has a full complement of I/O ports. What is further needed is a computer that provides these ports without the need for specialized cables or external port expanders.

SUMMARY OF THE INVENTION

To address these and other needs, the inventor devised a novel fold out port group movable between a stored position and an extended position. In one embodiment, a port group for use with a portable electronic device is disclosed. The port group comprises one or more ports for electrically interconnecting external equipment to the device, wherein the port group is pivotally connectable to the device for pivoting between a first, stored position and a second, extended position.

In another embodiment, a method for attaching external peripherals to a notebook computer is disclosed. The method comprises providing a notebook computer having a port group which has one or more ports for electrically interconnecting the external peripherals to the computer. The port group is pivotally connected to the computer for pivoting between a first, stored position and a second, extended position. The method further comprises connecting an external peripheral to the one or more ports.

In another embodiment, a portable computer system is provided. The computer system comprises a portable computer having a housing with an upper surface and a lower surface. The computer further comprises an input device coupled to the upper surface and a first plurality of ports for electrically interconnecting the system to external equipment, the first plurality of ports being located on the housing. The computer still further includes a port group having a second plurality of ports for electrically interconnecting the system to external equipment. The port group is pivotally connected to the housing about a pivot axis for pivoting between a first, stored position and a second, extended position.

Advantageously, the present invention allows a notebook computer to accommodate numerous I/O ports without the need for a separate port replicator, docking station, or proprietary branch cable. In addition, the fold out port group serves to selectively elevate the notebook computer keyboard, eliminating the need for a separate movable foot. Furthermore, by providing the ports on a fold out port group, additional ports are provided without adversely affecting the overall thickness of the notebook computer. Accordingly, the present invention permits the construction of a small form factor notebook computer having a full complement of conveniently accessible, integral I/O ports.

BRIEF DESCRIPTION OF THE DRAWINGS

The invention described herein will be further characterized with reference to the drawings, wherein:

FIG. 3 is a side elevation view of the notebook computer of FIG. 1;

FIG. 4 is a side elevation view of the notebook computer of FIG. 2;

DETAILED DESCRIPTION OF THE EMBODIMENTS

In the following detailed description of the embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Broadly speaking, the instant invention allows numerous I/O ports to be physically located on a small footprint, slim notebook computer. The invention provides these ports without the use of a conventional port replicator, docking station, or proprietary branching cable.

To obtain the needed space for these I/O ports, a fold out port group as further described below is provided. In addition to providing additional ports, the port group also functions as a leg to elevate one end of the computer housing when desired. While the invention is shown and described with reference to a notebook computer, the applicant perceives it is equally applicable to most any portable electronic device that requires connection to external equipment or peripherals including but not limited to keyboards, speakers, monitor, printers, audio/video equipment and the like. Accordingly, the embodiments described herein are offered not to limit but rather to teach the invention sufficiently to enable those of skill in the art to practice the invention. Where appropriate to avoid obscuring the invention, the discussion may also omit certain information that is not pertinent to the invention or that is otherwise known to those of skill in the art.

Figure 1:
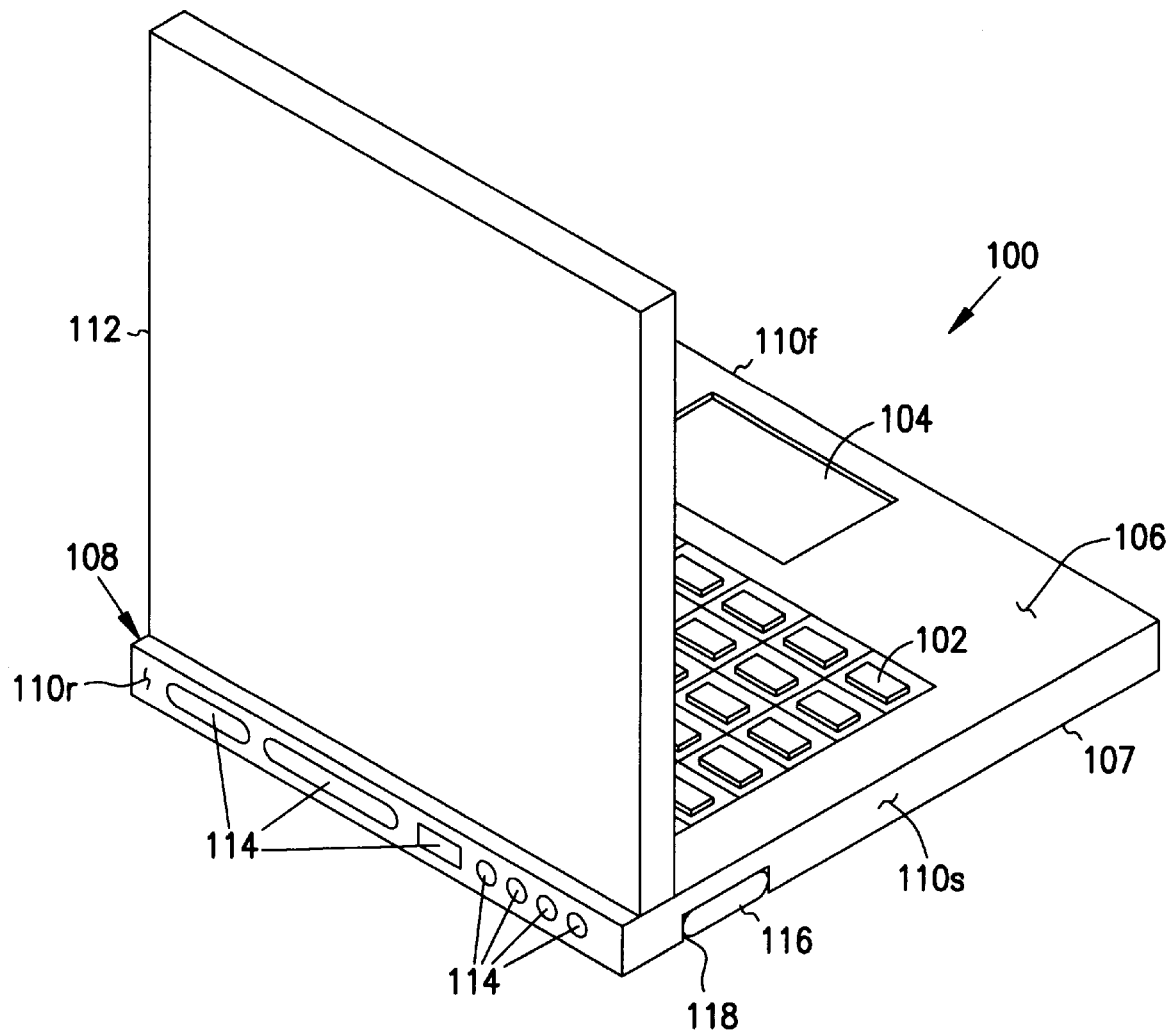
FIG. 1 is a perspective view of a notebook computer having a fold out port group according to one embodiment of the present invention, the port group shown in a first or stored position.

A notebook computer or computer system 100 in accordance with one embodiment of the invention is shown in FIG. 1. The computer comprises input devices such as a keyboard 102 and a touchpad 104 coupled to a first or upper surface 106 of a housing 108.

The housing, in one embodiment, defines a rectangular parallelepiped shape having a second or lower surface 107 defining the bottom of the housing and four side or edge surfaces 110 defining the perimeter. It is noted that throughout this specification, the terms upper, lower, front, back, side, and the like are used to describe the illustrated embodiments. These terms are provided for descriptive purposes only and by no means limit the scope of the invention. To simplify the discussion, the edge surfaces 110 will be specifically identified as front surface 110f, rear surface 110r, and side surface 110s. A flip-up display screen 112 is hingedly connected to the housing 108 generally along the intersection of the upper surface 106 and the rear surface 110r. The rear surface 110r comprises various I/O ports 114 necessary to interface the computer 100 to external devices (not shown). It is noted that while different port configurations are shown, they are generically referred to herein as input/output or "I/O ports." They may include ports adapted for most any device and utilizing most any communication protocol including: RS-232, IEEE 1394, parallel, infrared, PS/2, USB, audio/video, RJ45 (network), RJ-11 (modem), small computer system interface (SCSI), national television standards committee (NTSC), and various proprietary connectors (docking station, port replicator) to name a few.

While it is not necessary to provide every connector, it is commercially advantageous to make the notebook computer 100 as versatile as possible. Consumers are more willing to purchase a portable computer when they are convinced that the unit is fully functional with both legacy as well as more modern peripherals. When the expandability of the computer is limited or requires external port expanders to connect with certain devices, the notebook may be perceived to be less versatile than a full-featured computer. Accordingly, the ability to incorporate many ports on a small notebook computer is highly desirable.

In general, ports are located along the edge surfaces 110. While some notebooks utilize the front and side surfaces 100f, 110s for some smaller ports, most ports are located on the rear surface 110r. This is because the front and side surfaces typically have limited space available due to internal components such as PCMCIA cards, batteries and disk drives which are typically mounted and accessed along these sides. In addition, large cables extending from the sides or front of the computer interfere with the immediate work space and furthermore create an aesthetically undesirable appearance. Thus, most notebooks incorporate the majority of ports on the rear surface 110r.

Figure 2:
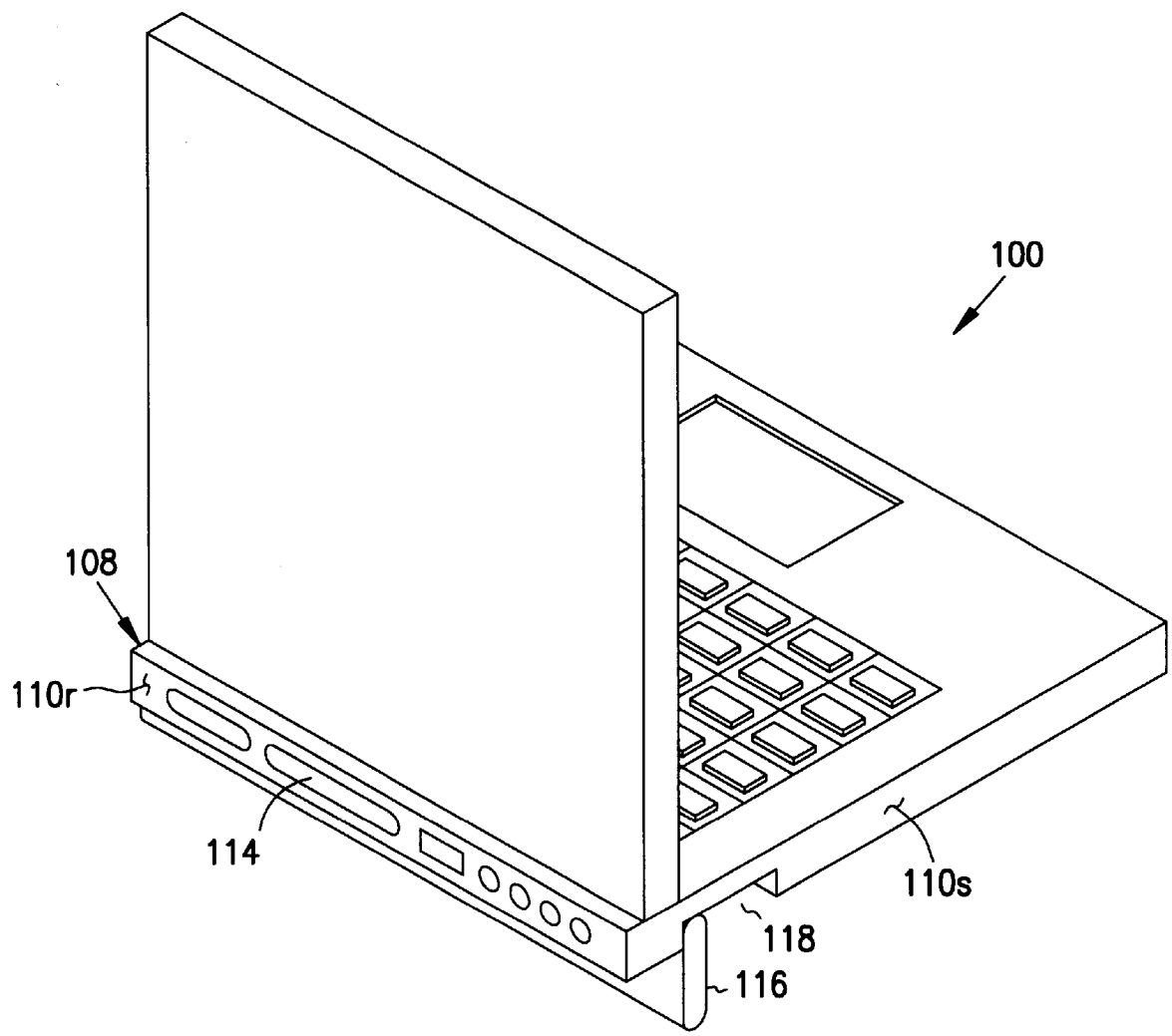
FIG. 2 is a perspective view of the notebook computer of FIG. 1 with the port group shown in a second or extended position.
Figure 5:
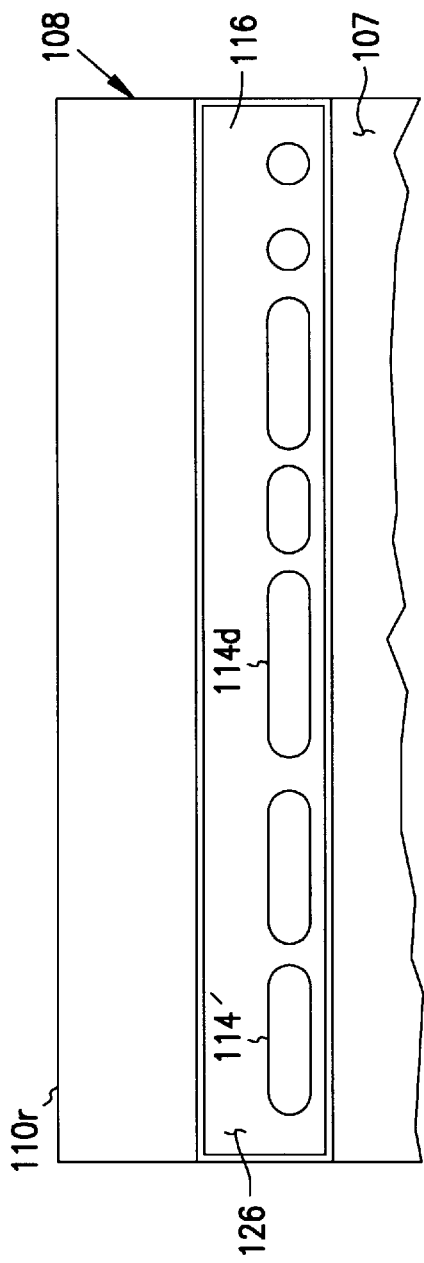
FIG. 5 is a bottom plan view of the notebook computer of FIG. 1.
Figure 6:
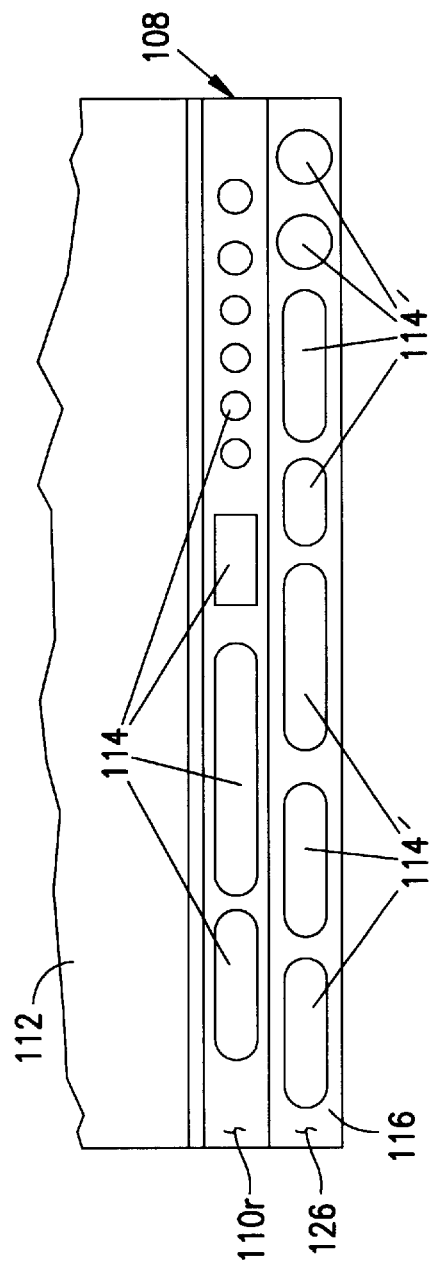
FIG. 6 is a rear elevation view of the notebook computer of FIG. 2.

In a modern notebook computer, the rear surface is generally 9–11 inches wide and 0.5–1.0 inches high. Even when efficiently utilized, this surface provides only minimal area for port installation. The present invention includes additional area for port installation by including a fold-out port group 116 as shown in one embodiment in FIGS. 1–6. When in a first or stored position, the port group 116 lies within a slot 118 in the lower surface 107 as shown in FIGS. 1, 3 and 5. That is, the port group 116 is stored within the physical envelope of the housing 108. However, when additional ports are needed, the port group 116 may be selectively pivoted to a second or extended position as shown in FIGS. 2, 4 and 6.

The port group 116 moves between the first and second position by pivoting about a pivot axis defined by a hinge 120 (see FIGS. 3 and 4). The hinge may include detents (not shown) to retain the port group 116 in the stored, extended, or any intermediate position. As further described below, the ports incorporated on the port group 116 may be operational in either the stored or extended positions or, for that matter, in any intermediate position. The hinge 120, in one embodiment, is constructed in a manner similar to those hinges used on conventional notebook computer display screens.

Referring particularly to FIGS. 3–6, the port group 116 also serves a secondary function of raising the rear of the housing 108. When in the stored position, the housing 108 rests atop a work surface 122 on a plurality of isolation feet 124 (see FIG. 3) such that the keyboard 102 is generally parallel to the work surface 122. However, when the port group is pivoted to the extended position as shown in FIG. 4, the housing is elevated along the rear, resulting in an angled keyboard orientation which some users find more comfortable. To isolate the computer 100 from the surface 122 when the port group is extended, the port group includes, in one embodiment, an isolation pad 125 made of a material similar to the feet 124. The port group 116 has a thickness 123 designed to accommodate the deepest port connector to be located on the port group. In one embodiment, the thickness is approximately ten millimeters, which is sufficient to accommodate deep connectors such as game ports. However, port groups of other thicknesses are equally within the scope of the invention.

Referring still to FIGS. 3–6, the port group 116 comprises a first side 126 and a second side 128. When the port group 116 is in the stored position as shown in FIGS. 3 and 5, the first side 126 is accessible from beneath the computer 100 while the second side 128 is hidden. Access to the first side 126 when the port group is in the stored position is advantageous for interconnecting an external peripheral 129 as shown in FIG. 3. Here, a cable 131 passes through an aperture 127 in the work surface and connects the peripheral 129 to the port 114'. In another embodiment, a port 114' on the first side 126 is used to interconnect the computer 100 to a wall-mounted or bottom-connecting docking station. In this case, one port 114d (see FIG. 5) on the surface 126 is configured for interconnection with the docking station.

While only the first side 126 is accessible when the port group is stored, both sides 126, 128 are accessible when the port group is extended as shown in FIG. 4. Accordingly, I/O ports 114' may be utilized on both sides 126, 128.

Referring now to FIG. 6, the additional ports 114' provided by the first side 126 of the port group 116 are illustrated in accordance with one exemplary embodiment of the invention. As the figure shows, the port group 116 can approximately double the space available for I/O ports without increasing the overall size envelope of the notebook computer 100.

Figure 7:
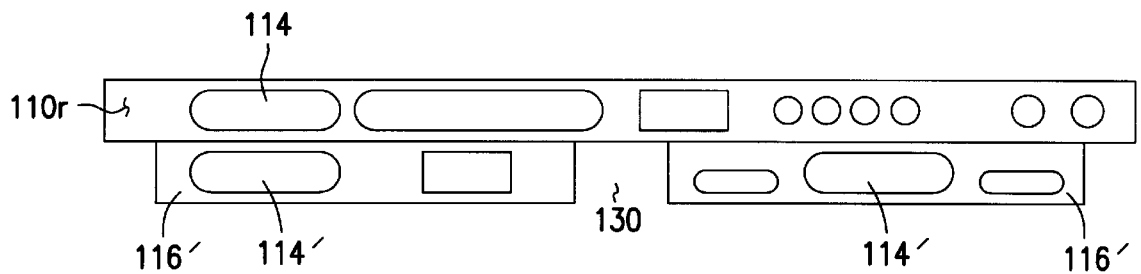
FIG. 7 is a rear elevation view of a notebook computer having a fold out port group in accordance with another embodiment of the invention.

FIG. 7 shows another exemplary embodiment of the port group 116. Here, the port group comprises two separate groups 116'. By providing separate port groups, the slot 118 is not continuous across the entire housing 108. In addition to allowing a structurally stiffer housing, the multiple group configuration provides a pass-through area 130 for cables that interconnect to the second side 128 (not shown) of the port group. Furthermore, the separate port groups 116' provide a convenient method of segregating related ports 114'. While the embodiment illustrated incorporates two port groups 116', other embodiments having other numbers of groups are also possible and are within the scope of the invention.

Having described the mechanical configuration of one exemplary embodiment of the invention, attention is now directed to interconnecting means for electrically interconnecting the housing 108 with the ports 114' located on the port group 116. For clarity, the following description explains electrical interconnection of a single exemplary conductor. Those of skill in the art will realize that a plurality of conductors generally corresponding to the total number of conductors on each I/O port 114' will be required.

Figure 8:
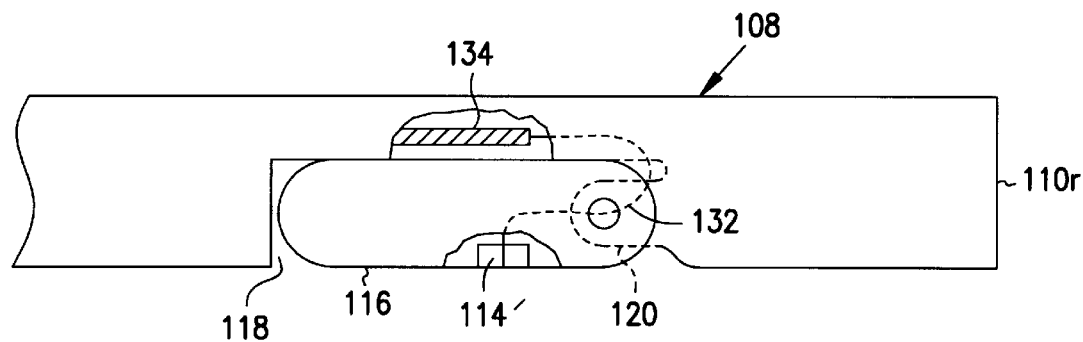
FIG. 8 is a partial side view of the notebook computer of FIG. 1 illustrating electrical interconnection between the computer and the port group in accordance with one embodiment of the invention.

Referring first to FIG. 8, one embodiment of the invention utilizes a flat ribbon cable 132. Flat ribbon cables are known in the art and are commonly used on notebook computers to electrically couple hinged display screens. The cable 132 is advantageous as it provides, a constant connection between the ports 114' and the motherboard electronics 134. Accordingly, the ports are active when the port group is in the stored, extended, or any intermediate position.

Figure 9:
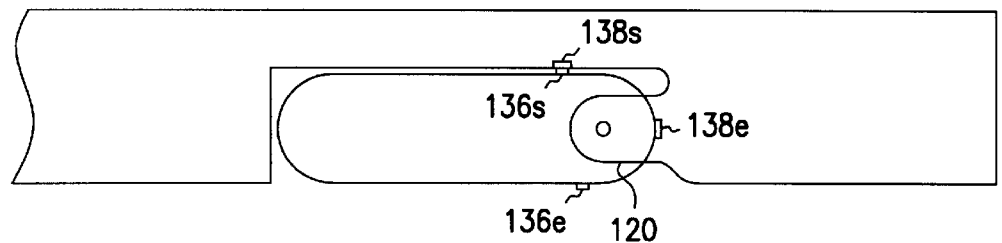
FIG. 9 is a side view of the notebook computer of FIG. 1 illustrating electrical interconnection between the computer and the port group in accordance with another embodiment of the invention.
Figure 10:
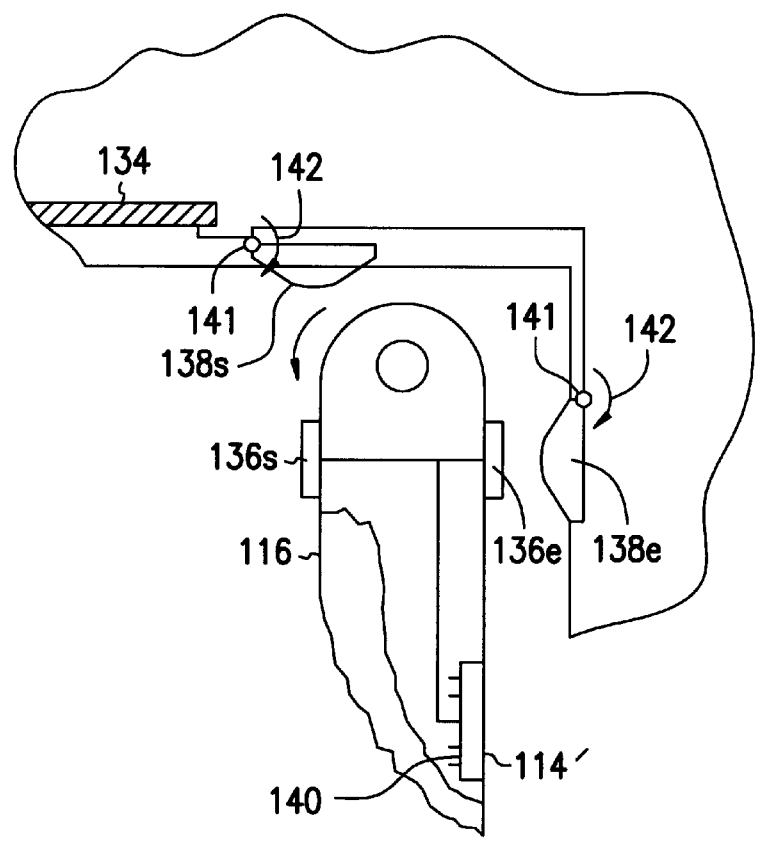
FIG. 10 is an enlarged, schematic side elevation view of the computer of FIG. 9.
Figure 11:
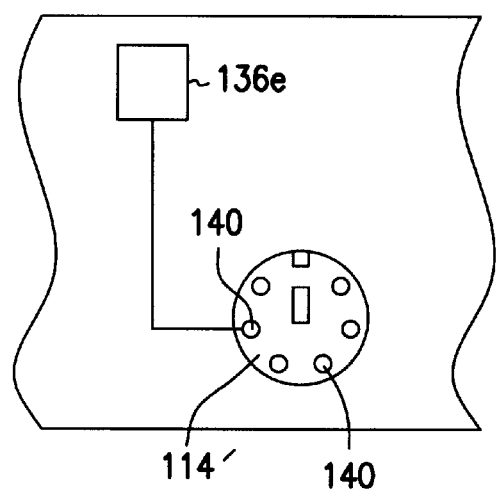
FIG. 11 is a schematic partial rear view of the computer of FIG. 9.

In another embodiment, electrical interconnection is provided by a series of discreet electrical connections as illustrated in FIGS. 9–11. Referring first to FIG. 9, the port group 116 comprises a first series of conductors 136s and a second series of conductors 136e. The housing 108, in turn, comprises a first series of mating conductors 138s and a second series of mating conductors 138e. Once again, to avoid confusion, the interconnection of only one conductor will be described.

With reference to FIGS. 10 and 11, a schematic view of the interconnection between the port 114' and the motherboard electronics 134 is illustrated. The I/O port 114' comprises a plurality of conductors 140 which are electrically coupled to both conductors 136s, 136e. The mating conductors 138s, 138e are positioned to contact the respective conductors 136s, 136e depending on the position of the port group 116. For example, when the port group is in the extended position, the conductor 136e contacts the conductor 138e while, when the port group is stored, the conductor 136s contacts the conductor 138s. Both the conductors 138e, 138s are interconnected and electrically coupled to the motherboard electronics 134. Accordingly, electrical interconnection is provided between the conductor 140 and the motherboard electronics 134 when the port group is in either the stored or extended position.

To ensure an adequate electrical connection is maintained, the conductor 138 is, in one embodiment, biased towards the respective connector 136. The conductor may be a thin, stiff wire that is biased by deformation of the wire 138 itself or, alternatively, by other conventional means. In one embodiment, a torsion spring (not shown), biases the conductor 138 in the direction 142 about a pivot 141.

Although described in terms of specific exemplary embodiments, other embodiments of the interconnecting means are also possible. For example, a plurality of separate wires or cables may be used to interconnect the housing and the port group. In another embodiment, the port group has a connector that engages a mating connector on the housing whenever the port group is either stored or extended. This connector provides electrical interconnection for all the ports located on the port group. Thus, the embodiments discussed herein and illustrated in the figures are exemplary only. Any interconnecting means that provides electrical coupling of the port group to the housing while permitting pivoting of the port group relative thereto is within the scope of the invention.

Figure 12:
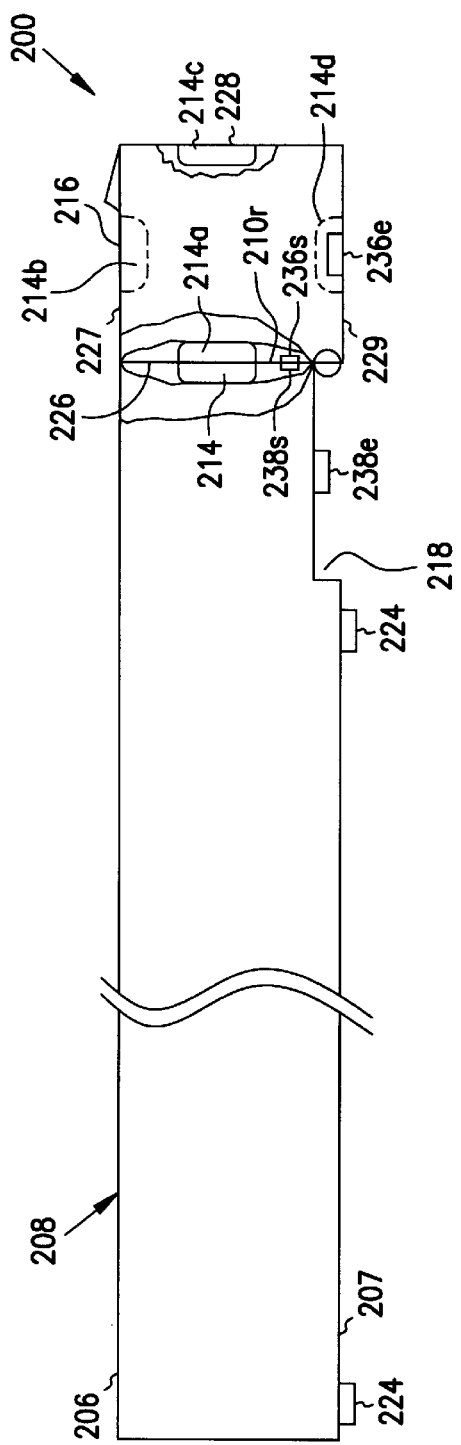
FIG. 12 is a side elevation view of a notebook computer having a fold out port group in accordance with yet another embodiment of the invention, the port group being shown in a first or stored position.
Figure 13:
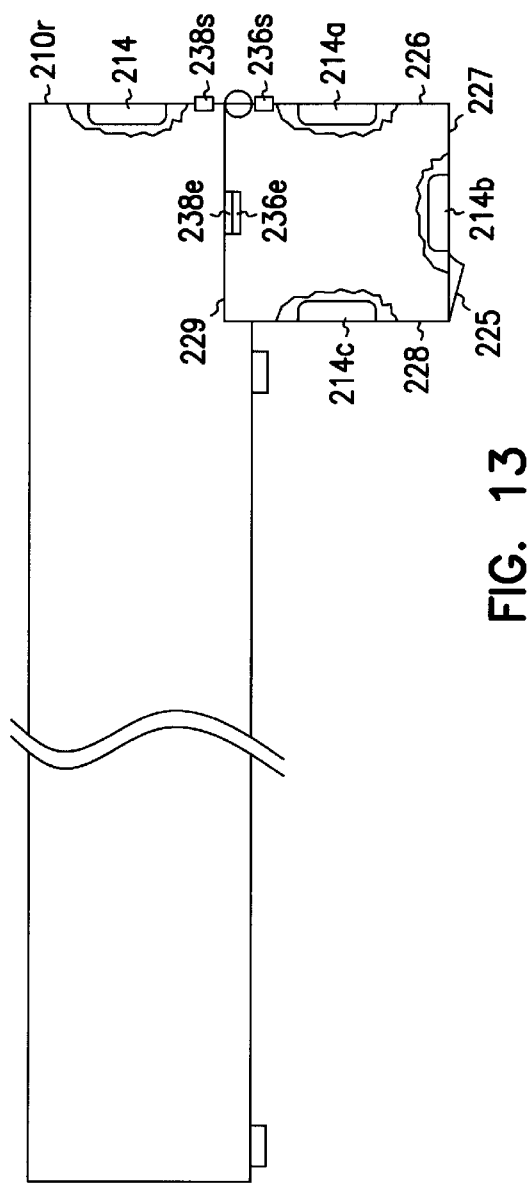
FIG. 13 is a side elevation view of the notebook computer of FIG. 11 with the port group shown in a second or extended position.

While the port group 116 shown in FIGS. 1–11 folds outwardly from underneath the computer 100, other embodiments of the present invention are also possible. For example, FIGS. 12 and 13 show a notebook computer 200 having a housing 208 comprising a first or upper surface 206 and a second or lower surface 207. The housing further includes a plurality of side surfaces 210 including a rear surface 210r. Located on the surface 210r are a plurality of ports 214. A port group 216 is hingedly coupled to housing 208 generally at the intersection of the lower surface 207 and a rear surface 210r. The port group 216 is shaped as a rectangular parallelepiped and includes a first side 226, a second side 227, a third side 228, and a fourth side 229. The port group 216 may include additional ports 214 on one or more of the sides 226, 227, 228, or 229. For clarity, ports on the first side 226 are labeled 214a while those on the second, third, and fourth sides are labeled 214b, 214c, and 214d respectively.

When the port group 216 is in a first, stored position (as shown in FIG. 12), the first side 226 is adjacent to the surface 210r. When the port group is pivoted to a second, extended position (as shown in FIG. 13), the port group folds underneath the rear of the housing 208. To accommodate the port group in the extended position, the housing, in one embodiment, includes a slot 218 which receives the side 229.

In the stored position as shown in FIG. 12, ports 214 and 214a, located on the surface 210r and the first side 226 respectively, are inaccessible. This provides a convenient method of selectively protecting fragile ports by merely moving the port group 216 to the stored position. Further, by providing a locking device (not shown), the port group 216 can be used to prevent access to the ports 214 and 214a. When desired, frequently accessed ports 214c may be provided on the side 228 so that they remain accessible when the port group is closed.

When the port group is in the extended position, the ports 214 on the surface 210r are exposed. In addition, ports 214a which were inaccessible when in the stored position, are now available. Thus, when in the extended position, the port group 216 provides a port configuration (when viewed from the rear of the computer 200) substantially similar to that shown in FIG. 6.

As with the previously discussed embodiments, the port group 216 also forms a leg to elevate the rear side of the housing 208. When stored, the housing rests on isolation pads 224. However, when the port group is extended, the housing rests at the rear end on a pad 225. This orientation presents a sloped keyboard for more convenient operation.

The port group 216 may be electrically interconnected to the motherboard electronics via a flat ribbon cable (not shown) or independent interconnects (236s and 238s for the stored position and 236e and 238e for the extended position) as already discussed herein with respect to conductors 136e, 136s, 138e, and 138s.

The port group 216 offers a further advantage in that the hinge 220 is external to the housing 208. Accordingly, the hinge, in one embodiment, permits the port group 216 to be easily de-coupled from the housing 208. De-coupling the port group permits the user to reduce the footprint of the computer. Further, by permitting removal of the port group, specialized modules may be interchanged. For example, one port group module could provide ports necessary for audio/ video capture or playback while another port group module could provide more standard I/O ports (serial, parallel, PS2). Other customized port group modules are also possible. While the port group 216 is described as detachable, this feature is by no means limited to the embodiment shown in FIGS. 12–13. Thus, the port group 116 shown in FIGS. 1–6 and the port group 116' shown in FIG. 7 could also be detachably connected to the respective housings.

Advantageously, the present invention allows a notebook computer to accommodate numerous I/O ports without the need for a separate port replicator, docking station, or proprietary branch cable. In addition, the fold out port group serves to selectively elevate the notebook computer keyboard, eliminating the need for a separate movable foot. Furthermore, by providing the ports on a fold out port group, additional ports are provided without adversely affecting the overall thickness of the notebook computer. Accordingly, the present invention permits the construction of a small form factor notebook computer having a full complement of conveniently accessible, integral I/O ports.

Preferred embodiments of the present invention are described above. Those skilled in the art will recognize that many embodiments are possible within the scope of the invention. Variations, modifications, and combinations of the various parts and assemblies can certainly be made and still fall within the scope of the invention. Thus, the invention is limited only by the following claims, and equivalents thereto.

What is claimed is:

1. A port group for use with a portable electronic device, the port group comprising one or more ports for electrically interconnecting external equipment to the device, wherein the port group is pivotally connectable to the device for pivoting between a first, stored position and a second, extended position wherein the port group forms a leg that elevates one end of the device when in the second extended position.

2. The port group of claim 1 wherein the ports are accessible in both the first and second position.

3. A portable electronic device comprising a port group having one or more ports for electrically interconnecting external equipment to the device, wherein the port group is pivotally connectable to the device for pivoting between a first, stored position and a second, extended position wherein the port group forms a leg that elevates one end of the device when in the second extended position.

4. A portable computer system comprising:
   a portable computer having:
      a housing comprising a rear surface, an upper surface and a lower surface;
      an input device coupled to the upper surface; and
   a port group having a first plurality of ports and a second plurality of ports for electrically interconnecting the system to external equipment, wherein the port group is pivotally connected to the housing about a pivot axis for pivoting between a first, stored position and a second, extended position and further wherein the first plurality of ports are exposed in the first stored position and the first plurality of ports and the second plurality of ports are exposed when in the second, extended position.

5. The computer system of claim 4 wherein the lower surface of the housing further comprises a slot, the slot generally parallel with the rear surface of the housing.

6. The computer system of claim 5 wherein the port group is adapted to fit within the slot such that in the first position, the port group is nested within the slot, and in the second position, the port group extends outwardly from the lower surface to form a leg to elevate the housing.

7. The computer system of claim 4 wherein the pivot axis is located generally along the intersection of the lower surface and the rear surface of the housing.

8. The computer system of claim 4 wherein the port group is substantially the same thickness as the housing, and wherein the port group, in the first position, substantially covers the rear surface, and, in the second position, extends downwardly from the housing to form a leg to elevate the housing.

9. The computer system of claim 4 wherein the port group has a substantially rectangular parallelepiped shape that, in the first position, includes a first side adjacent to the rear surface, a second side parallel with the upper surface, a third side opposite the first side, and a fourth side opposite the second side.

10. The computer system of claim 9 wherein the port group includes a port on at least one of the first, second, third, and fourth sides.

11. The computer system of claim 4 wherein the port group is interchangeable with a second port group.

12. The computer system of claim 4 further comprising interconnecting means for electrically interconnecting the first and second plurality of ports to the housing.

13. The computer system of claim 12 wherein the interconnecting means couples the first plurality of ports to the housing when the port group is in the first position.

14. The computer system of claim 12 wherein the interconnecting means couples the second plurality of ports to the housing when the port group is in the second position.

15. The computer system of claim 12 wherein the interconnecting means is a flat ribbon cable routed proximal the pivot axis.

16. The computer system of claim 12 wherein the interconnecting means comprises a first plurality of conductors coupled to the port group and a corresponding second plurality of conductors coupled to the housing.

17. The computer system of claim 16 wherein the first plurality of conductors contacts the second plurality of conductors when the port group is in the first position.

18. The computer system of claim 16 wherein the first plurality of conductors contacts the second plurality of conductors when the port group is in the second position.

19. The computer system of claim 16 wherein one or more of the first and second plurality of conductors is biased.

20. A portable computer system comprising:
a portable computer having:
  a housing comprising an upper surface and a lower surface, wherein the lower surface of the housing includes a slot;
  an input device coupled to the upper surface; and
  a port group having a plurality of ports for electrically interconnecting the system to external equipment, wherein the port group is pivotally connected to the housing about a pivot axis for pivoting between a first, stored position in which the port group is nested within the slot, and a second, extended position, in which the port group extends outwardly from the lower surface to form a leg to elevate the housing.

21. A portable computer system comprising:
a portable computer having:
  a housing comprising an upper surface and a lower surface,
  an input device coupled to the upper surface; and
a port group having a plurality of ports for electrically interconnecting the system to external equipment, the port group being pivotally connected to the housing about a pivot axis for pivoting between a first, stored position and a second, extended position, wherein the port group is substantially the same thickness as the housing, and wherein the port group, in the first position, substantially covers the rear surface, and, in the second position, extends downwardly from the housing to form a leg to elevate the housing.

* * * * *